No. 668,763.  
A. VAN HOUWELING.  
AUTOMATIC BAND CUTTER AND FEEDER.  
(Application filed Oct. 23, 1899.)  
Patented Feb. 26, 1901.
(No Model.) 2 Sheets—Sheet 1.
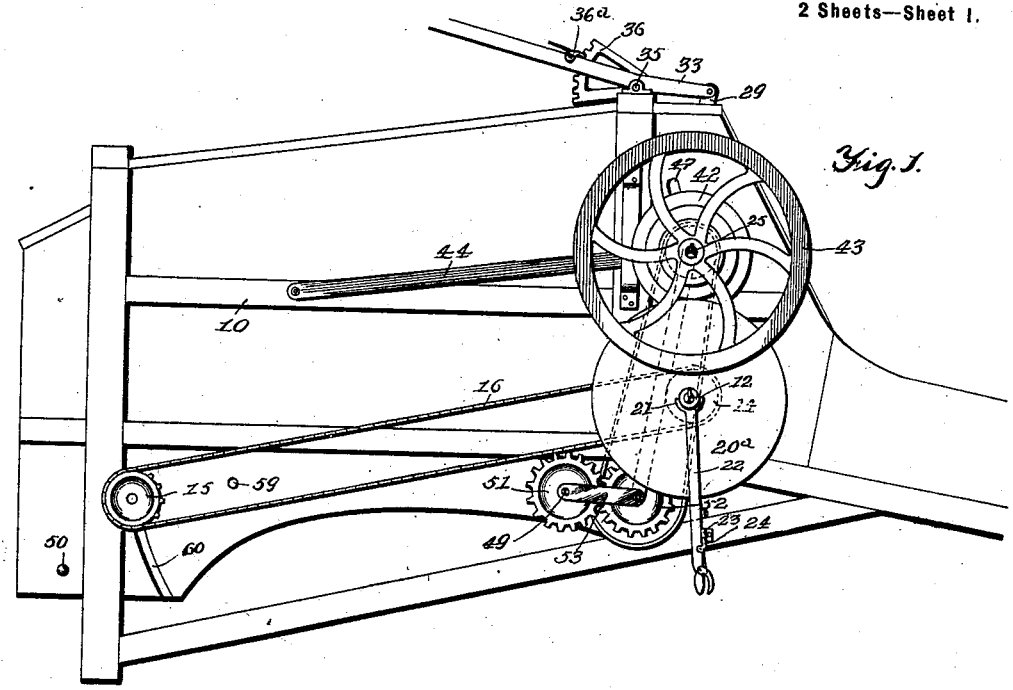
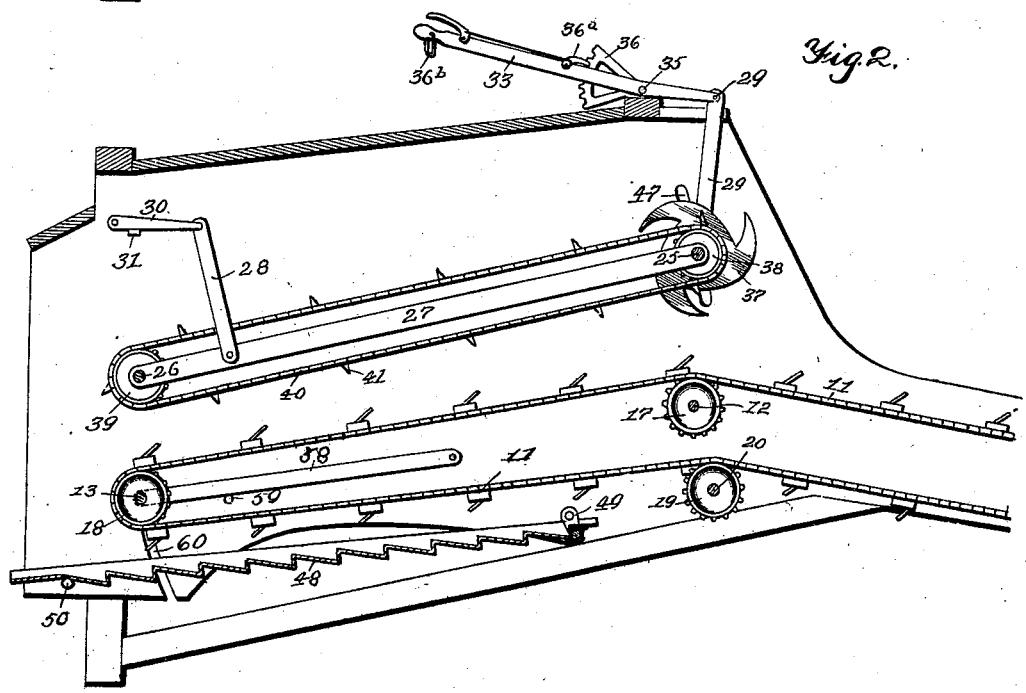
Witnesses:  
R. G. Orwig  
Thomas G. Orwig  
Inventor:  
Arthur Van Houweling

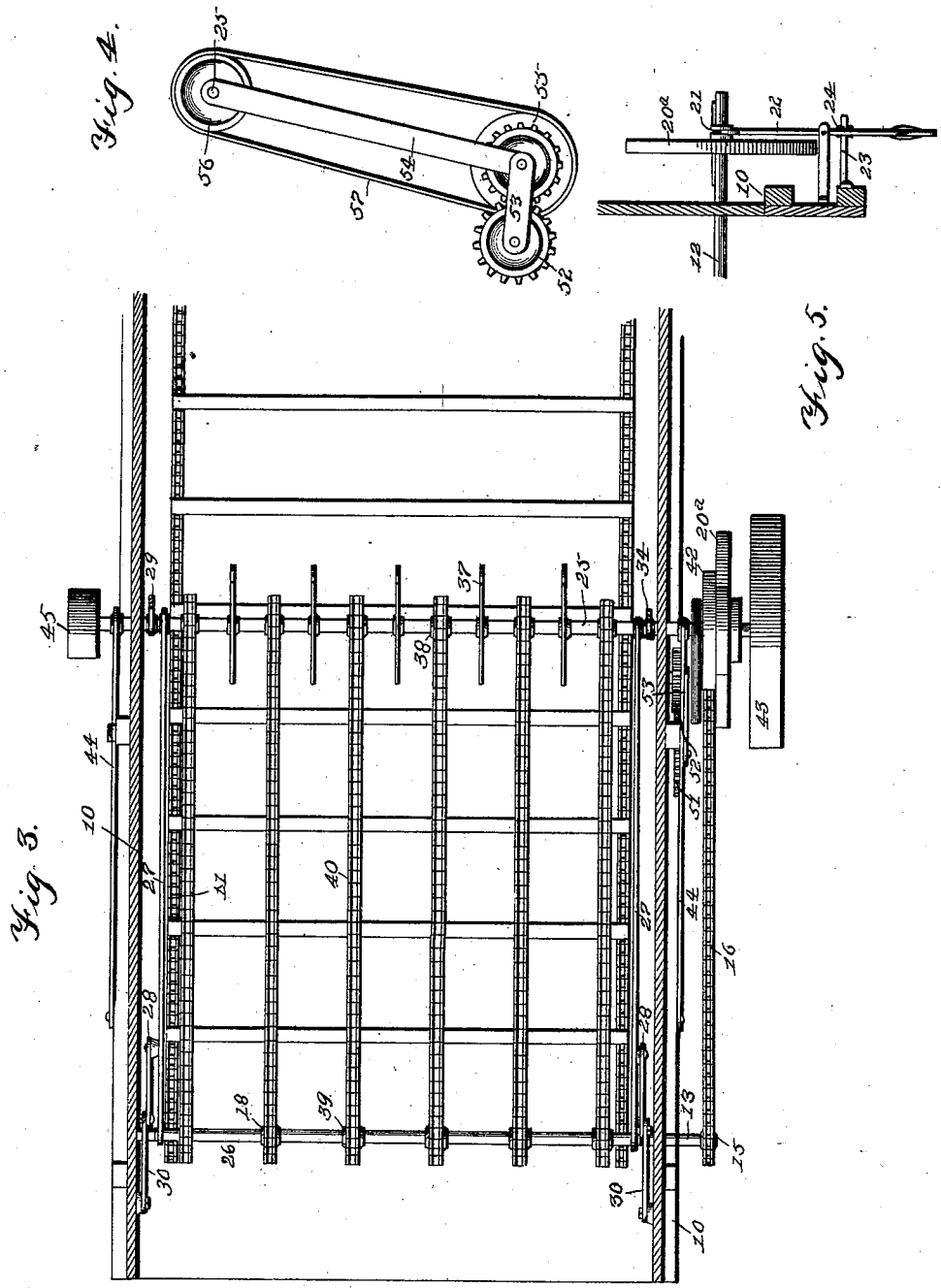

UNITED STATES PATENT OFFICE.

ARTHUR VAN HOUWELING, OF PELLA, IOWA.

AUTOMATIC BAND-CUTTER AND FEEDER.

SPECIFICATION forming part of Letters Patent No. 668,763, dated February 26, 1901.

Application filed October 23, 1899. Serial No. 734,537. (No model.)

*To all whom it may concern:*

Be it known that I, ARTHUR VAN HOUWELING, a citizen of the United States, residing at Pella, in the county of Marion and State of Iowa, have invented a new and useful Automatic Band-Cutter and Feeder, of which the following is a specification.

The objects of my invention are, first, to provide a simple, strong, durable, and inexpensive band-cutter and self-feeder for threshing-machines, in which the quantity of grain fed to the thresher is automatically governed and kept uniform, and when any grain approaches the cylinder in tightly-bound bundles or in a wet or tangled condition the conveyer is instantly automatically stopped, so that the same cannot enter the thresher, and the cutter and upper conveyer continue to operate and feed from the top of such bundles or masses of grain until the same are reduced in bulk sufficiently to be in proper condition for feeding to the cylinder when the conveyer again automatically starts.

A further object is to provide a machine of this class in which the quantity of grain fed to the cylinder may be easily and quickly regulated, so that when the grain is in loose bundles and dry it may enter the cylinder in a comparatively thick layer and when tightly bound and wet it is fed in a comparatively thin layer.

My invention consists, essentially, in certain details in the construction and arrangement of a device above the conveyer, of a feeder which forces the top layer of the grain on the conveyer into the thresher and serves to drive the conveyer, and which is vertically movable and so arranged and connected with the conveyer that when it is raised by an excess of grain the conveyer is instantly stopped; and my invention consists, further, in the construction, arrangement, and combination, with the feeder and cutter mechanisms, of the means for connecting the upper feeder and cutter with the conveyer, whereby the objects contemplated are attained, as hereinafter more fully set forth, pointed out in my claims, and illustrated in the accompanying drawings, in which—
Figure 1 shows a side elevation of the band-cutter and feeder with the outer end of the conveyer broken off. Fig. 2 shows a vertical longitudinal sectional view of the same. Fig. 3 shows a top view of the same with the cover of the frame removed. Fig. 4 shows a detail view illustrating the means for shaking the pan below the inner end of the conveyer, and Fig. 5 shows the means for adjusting the friction-wheel.

Referring to the accompanying drawings, the reference-numeral 10 is used to indicate the frame of the machine, and 11 a conveyer mounted for operation in the frame, both of which are of the usual construction. Power for driving the conveyer is transmitted to the central shaft 12, as hereinafter described, and this power is transmitted to the inner end conveyer-shaft 13 by means of the sprocket wheels and chain 14 15 16. The sprockets 17 on the shaft 12 are loosely mounted, while the sprockets 18 on the shaft 13 are fixed to drive the conveyer. The sprockets 19 on the shaft 20 serve to hold up the central portion of the conveyer as it is returning. It is to be understood that there are two of each of the sprockets 17 and 19, although one only of each is illustrated.

On the shaft 12 a friction-wheel $20^a$ is feathered, and its hub is provided with an annular groove 21. A lever 22 is fulcrumed to the machine-frame, and its bifurcated end is placed in said annular groove, whereby the friction-wheel may be moved longitudinally upon the shaft. A segmental ratchet 23 is also fixed to the frame, and a spring-actuated ratchet device 24 on the lever engages said rack, whereby the friction-wheel may be held in any position in which it may be placed.

I have positioned an auxiliary feeding-conveyer above the aforesaid conveyer composed of two shafts 25 and 26, connected by means of the side pieces 27. These side pieces are supported by means of the hangers 28 at its forward end and the hangers 29 at its rear end. Said hangers 28 are pivoted at their upper ends to the arms 30, which are pivoted to the machine-frame and are held against a movement downwardly beyond the horizontal by means of the stops 31. This permits a free vertical movement of the forward end of said auxiliary conveyer from the position illustrated in Fig. 2 upwardly. The forward end of the auxiliary conveyer is supported on the hangers 32, one of which is pivoted to a lever 33 and the other to an arm 34, similar to the arms 30. Said lever and arm are fixed to a rock-shaft 33, which extends across the machine-frame. A segment 36 is fixed to the machine-frame to be engaged by a pawl 36ª, and a ring 36ᵇ in the handle of the lever provides means whereby this pawl may be held out of contact with the segment, so that the lever may have a free up-and-down movement. When it is desired to hold the cutter-shaft elevated, the pawl is permitted to engage the rack. This gives the rear end of the auxiliary conveyer a free upward movement, but prevents it from moving downwardly, and also provides means whereby the said rear end may be raised and supported in an elevated position by said lever. Upon this shaft 25 I have secured a number of rotary band-cutting knives 37 and fixed a series of sprockets 38. A like number of sprockets 39 are fixed to the shaft 26, and the chains 40 connect them. Said chains are provided with the projecting fingers 41 to engage the grain. In this shaft 25 I have also fixed a cone friction-wheel 42 and a balance-wheel 43. The said cone-wheel has a number of surfaces of different diameters that may be engaged by the friction-wheel 20, so that the relative speeds of the shafts may be changed.

I have provided for preventing a longitudinal movement of the auxiliary conveyer by means of the arms 44, which are pivoted to the side of the machine-frame and have the shaft 25 mounted in their rear ends. On one end of the shaft 25 is a belt-wheel 45, and a belt (not shown) connects the same with the threshing-machine. The said arms 44 are placed in alinement with these belt-wheels, so that an up-and-down movement of the shaft 25 will not materially affect the tension of the belt. Slots 47 are made in the machine-frame to permit this up-and-down movement.

Beneath the inner end of the conveyer I have located a shaking-pan 48 to conduct any grain that may have been released from the bundle during the cutting and feeding of the same to the thresher. The outer end of this pan is supported on a crank-shaft 49 and the inner end on the detachable pins 50. Hence when the shaft 49 is rotated the pan will be shaken, and when it is desired to obtain access to the cylinder the pins are withdrawn and the inner end of the pan permitted to drop. In the said crank-shaft is a gear-wheel 51, and adjacent thereto is a mating gear-wheel 52 in mesh therewith and supported by an arm 53, that is attached to the crank-shaft and the shaft of said gear 52, and also an arm 54, that attaches to the said shaft, and also to the shaft on which the rotary cutters are fixed. A belt-wheel 55 is also fixed to the shaft of said gear 52, and a belt-wheel 56 on the rotary cutter-shaft is connected therewith by means of the belt 57. Obviously the pan will be operated during the movement of the cutters, and this will not be affected by the up-and-down movement of said cutter-shaft.

I have provided means also for lowering the inner end of the conveyer to provide access to the cylinder, as follows: The shaft of said conveyer at the inner end is supported in the arms 58, which arms are pivoted at their outer ends to the machine-frame, and their inner ends rest upon the detachable pins 59, inserted in the machine-frame. The slots 60 in the side pieces of the frame are provided to permit this movement.

In practical operation and assuming that all of the parts were in their proper relative positions, and assuming, further, that the grain to be fed is in a normal or average condition as regards compactness and dryness, the large friction-wheel would be set to engage the central portion of the cone friction-wheel. When power is applied to the shaft of the rotary cutters, it is obvious that motion will be imparted to the conveyer through the friction-wheel and that the straw will advance on the carrier, the bands be severed by the cutters, and the straw be evenly distributed and forced into the cylinder by the auxiliary upper conveyers. Assuming that the sheaves of grain are placed on the conveyer unevenly, or that a tangled and wet mass of grain appears that is not readily severed and evenly distributed by the cutters, the cutters and the outer end of the auxiliary conveyer will be at once raised, with the effect of disengaging the friction-wheels, and hence stopping the conveyer. However, the cutters and upper conveyer are not stopped, and they will continue to operate and will carry to the cylinder the top layer of said grain until so much is removed as will permit the cutter-shaft to lower by gravity and the friction-wheels again engage, whereupon the conveyer will again operate. If it should be found that this adjustment admits too much or too little grain to the thresher, the sliding friction-wheel may be placed in engagement with either the larger or smaller portion of the cone friction-wheel by first operating the lever to raise the cutter-shaft, then manipulating the lever that controls the sliding friction-wheel. Furthermore, when the sliding friction-wheel is placed in contact with the smaller portion of the cone-wheel, this will have the double effect of bringing the cutters closer to the conveyer and at the same time reducing the speed of said conveyer, so that with wet and tangled and tightly-bound grain a thin layer may be fed slowly and with loose and dry grain a thick layer may be fed rapidly.

Having thus described the invention, what I claim, and desire to secure by United States Letters Patent, is—

1. In a band-cutter and feeder, the combination of a frame, a conveyer in said frame, a friction-wheel on the conveyer-driving shaft, an auxiliary conveyer above the said conveyer composed of two shafts, side pieces for connecting the shafts, hangers pivoted to the side pieces and arms pivoted to the frame and also to said hangers, arms pivoted to the frame and extended substantially parallel with the auxiliary conveyer and pivoted to the outer shaft thereof, a series of rotary cutters on the outer shaft, sprockets on both shafts and a series of chains having projecting fingers traveling over said sprockets and a friction-wheel on said outer shaft to engage the aforesaid friction-wheel.

2. In a band-cutter and feeder the combination of a frame, a conveyer therein, to carry grain to the thresher, a friction-wheel feathered to the driving-shaft of the conveyer, a lever for sliding the wheel upon said shaft, an auxiliary conveyer above the first, a cone friction-wheel fixed to the driving-shaft of same to engage the aforesaid friction-wheel and means for permitting the up-and-down movement of the upper conveyer, a shaking-pan below the inner end of the conveyer, a crank-shaft attached to its outer end, a cog-wheel on the crank-shaft, a second cog-wheel meshed therewith, a belt-wheel connected with the second cog-wheel, an arm for connecting the two cog-wheels, an arm for connecting the second cog-wheel with the shaft of the rotary cutters, a belt-wheel on the said rotary cutter-shaft, and a belt for connecting said belt-wheels, for the purposes stated.

3. In a band-cutter and feeder, the combination of an endless conveyer to carry grain to a threshing-cylinder, a friction-wheel slidingly but non-rotatably mounted on one of the shafts thereof, means for adjusting the said friction-wheel longitudinally upon the shaft, a second endless conveyer mounted above the first and capable of bodily movement vertically, means for driving said upper conveyer, a friction-wheel fixed to one of the shafts of said upper conveyer having a number of flat peripheral surfaces, each of a different diameter and each capable of being engaged by the aforesaid friction-wheel whereby the lower conveyer may be driven at different speeds and stopped when any one of said flat peripheral surfaces on the upper friction-wheel is in engagement with the first-mentioned friction-wheel, upon an elevation bodily of said upper conveyer, for the purposes stated.

ARTHUR VAN HOUWELING.

Witnesses:
JAS. BARELS,
THOMAS G. ORWIG.